June 21, 1966  D. DANIELS  3,256,781
FLUID-ACTUATED POSITIONING MEANS
Original Filed May 14, 1962  2 Sheets-Sheet 1
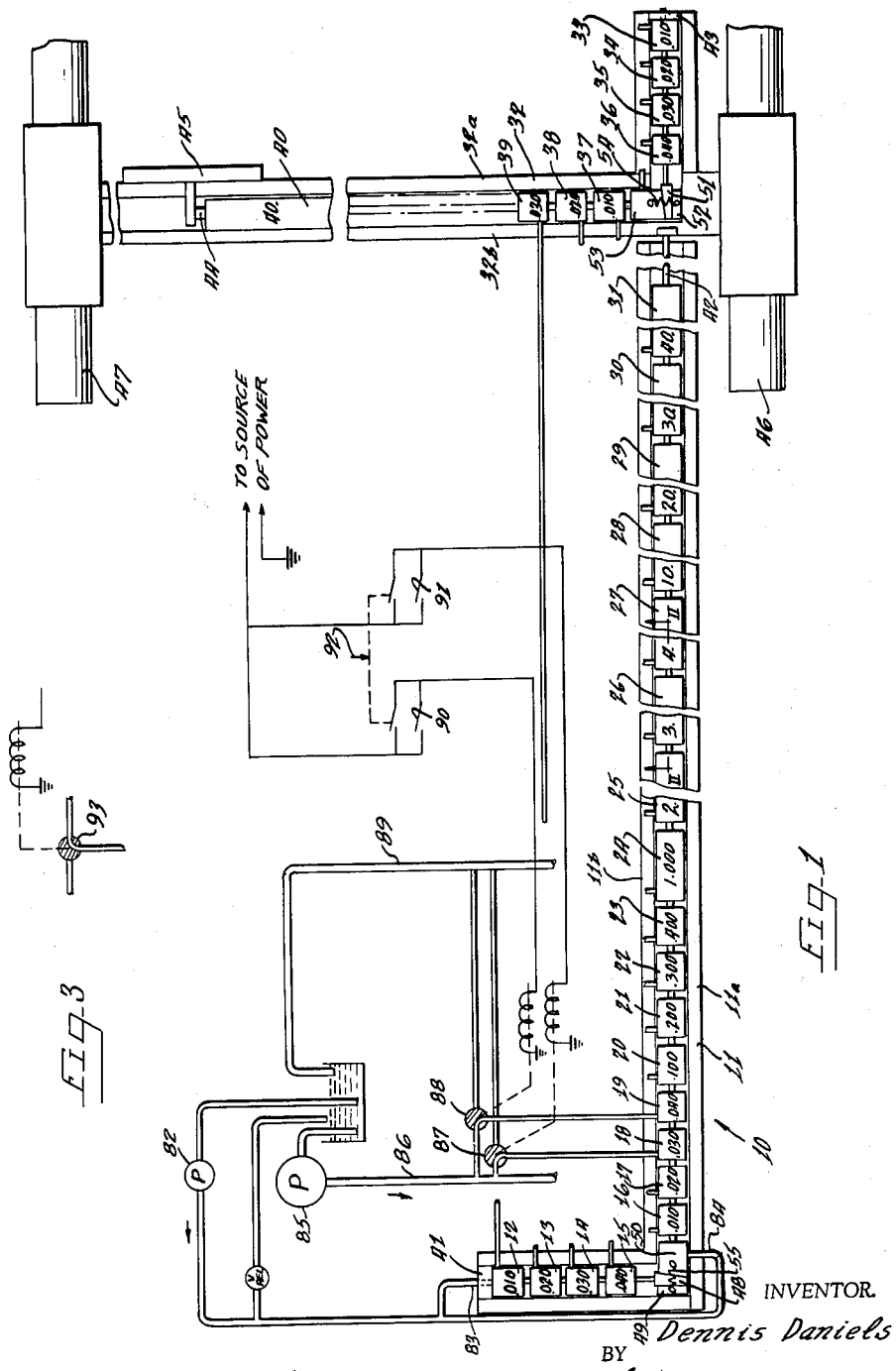

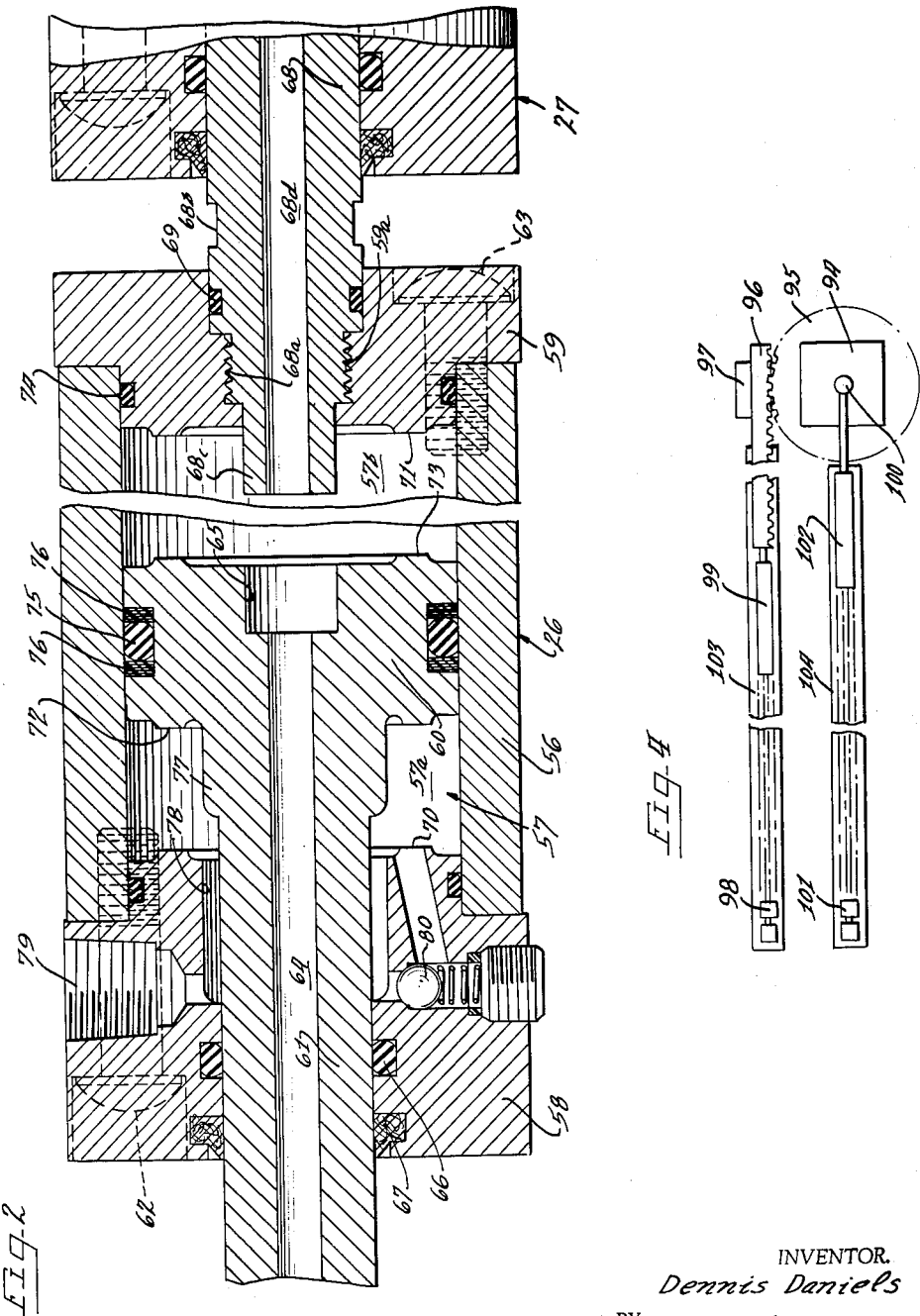

United States Patent Office 3,256,781
Patented June 21, 1966

3,256,781
FLUID-ACTUATED POSITIONING MEANS
Dennis Daniels, Williamsville, N.Y., assignor to Houdaille Industries, Inc., Buffalo, N.Y., a corporation of Michigan
Original application May 14, 1962, Ser. No. 194,387. Divided and this application Feb. 12, 1965, Ser. No. 432,346
4 Claims. (Cl. 92—61)

This application is a division of a copending application entitled "Fluid-Actuated Positioning Means," filed May 14, 1962, U.S. Serial No. 194,387.

This invention relates generally to fluid-actuated positioning means, and more specifically to a fluid actuator especially suited to effect digital positioning of one element with respect to another.

Although the principles of the present inventon may be included in various actuators, a particularly useful application is made in a positioning means wherein one element such as a workpiece is to be successively positioned in numerous positions relative to a second element such as a tool disposed at a fixed location.

The present invention contemplates the utilization of a number of such fluid actuators which may be individually actuated from one limit of travel to the other, and any combination of which fluid actuators may be jointly actuated, such actuators being mechanically connected together so that the element to be positioned is moved by an amount which is the sum of the travels of the actuated actuators. The instant invention may thus be used to advantage to position a pair of elements relatively to each other by amounts and distances which may be readily defined on either Cartesian or polar coordinates. The novel actuator structure minimizes the number of fluid connections required.

An object of the present invention is to provide an improved fluid actuator structure.

A further object is the provision of a fluid actuator structure having suitable damping means.

A still further object is the provision of a number of fluid actuators wherein the number of fluid connections is minimized.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a plan view, partially broken away, of a fluid-actuated positioning system provided in accordance with the principles of the present invention, the figure including diagrammatic electrical and hydraulic control circuit portions representative of that used to control the system;

FIG. 2 is a cross-sectional view, partially broken away, of fluid-actuated positioning means taken along line II—II of FIG. 1;

FIG. 3 is a variation of the control circuit shown in FIG. 1; and

FIG. 4 illustrates one mode of practicing this invention to relatively position elements using polar coordinates.

As shown on the drawings, the principles of this invention are particularly useful when embodied in a fluid-actuated positioning system such as illustrated in FIG. 1, generally indicated by the numeral 10. The system or mechanism 10 includes a fixed support and guide means 11 on which there is supported and guided five groups of fluid actuators 12–31, and a movable support and guide means 32 on which there is movably supported and guided a similar group of fluid actuators of which those identified by reference numerals 33–40 are illustrated.

The support and guide means 11 comprise, in this embodiment, a fixed channel defined by spaced parallel flanges 11a and 11b within which the actuators 12–31 are disposed and aligned. The actuators 12–31 are connected together mechanically in series as is explained later herein, one end of said series being fixed to a fixed support 41, and the other end of said series comprising a coupling member 42 connecting the movable end of the series of actuators 12–31 to the movable support and guide means 32.

The movable support and guide means 32 similarly supports the second series of actuators 33–40, keeping them in an aligned orientation by flanges 32a, 32b. The second series of actuators 33–40 is identical in number to the first series of actuators 12–31, and similarly, one end of such second series is supported fixedly as at 43 with respect to the guide means 32, while the opposite end of the series of actuators 33–40 is connected by a coupling element 44 to an element 45. The movable support and guide means 32 is movably supported on a pair of rails 46, 47 which are stationary, and thus comprise an element or reference with respect to which the element 45 is movable in a first axis or direction by the actuators 12–31, and in a second direction or axis by the actuators 33–40. The end use of the element 45 or the reference with respect to which it is positioned is not illustrated herein, but an example of utility of the same would be that the element 45 is adapted to be secured to a workpiece which is to be positioned by the system 10 with respect to a tool, the location of which is fixed with respect to the rails 46, 47. Therefore, for purposes of this illustration, it suffices to point out that the element 45 is relatively positioned with respect to the element 47 in two Cartesian coordinate axes.

All of the actuators functioning in one axis are connected mechanically together, and all of the actuators functioning in the other axis are also connected mechanically together. For purposes of understanding this invention, it may be assumed that all of the actuators are illustrated in their retracted or shortened positions. Assuming that the actuator 31 is driven to its fully extended position, it is evident that the support and guide means 32 will be driven by such amount, and hence the element 45 supported thereon will be moved this identical amount. Assuming further that the actuator 40 is also operated to its fully extended position, the element 45 will be given a further movement at right angles to the first described movement, by an amount equal to the full travel of the actuator 40.

In accordance with this invention, it is possible to shift the element 45 in a selected direction by any amount within the length and definition capabilities of the system 10. The numerals which appear on the various actuators represent a typical full travel of such actuator. Such travel may represent inches, centimeters, or other linear units. More specifically, these numerals represent the ratio of the full travel of one actuator to another. Thus the actuator 29 has twice the full travel of the actuator 28, and the actuators 30 and 31 respectively have three and four times the full travel of the actuator 28. Similarly, the actuators 25, 26 and 27 have two, three, and four times the full travel of the actuator 24. Thus also, the full travels of the actuators 21, 22 and 23 are integral multiples of the full travel of the actuator 20, while the full travels of the actuators 17, 18 and 19 are integral multiples of the full travel of the actuator 16. The actuators 12–15 in this embodiment are identical to the actuators 16–19 but their operating axis is disposed at right angles to the other operating axis, and they act through a wedge 48 to reduce their effectiveness, namely to divide their effective travel by ten. More specifically, the actuator 12 has a fixed and a movable portion, the fixed portion of which is secured to the fixed support 41, and to the actuator 13. In like manner, the actuators 13, 14 and 15 are serially connected together to the wedge 48 which has one side which engages a rigid reaction member 49, and an opposite side which engages a cam block 50. It is to be understood that when the several actuators 12–15 are not actuated or left in a particular position, the cam block 50 is stationary.

The foregoing description applies also to the series of actuators 33–40 wherein the actuator 33 has a fixed and a movable portion, the fixed portion of which is secured to the fixed support 43, and the movable portion of which is secured to the next actuator 34, which is secured successively through the actuators 35 and 36 to a wedge member 51 which is guided between a rigid reaction member 52 and a cam block 53. A pair of heavy springs 54, 55 insures that the cam blocks 53 and 50 are respectively retained in the most retracted position which the position of the wedges 51 and 48 respectively allow.

FIG. 2 shows in detail the structure of the actuator 26 which is mechanically coupled to the actuators 25 and 27. The actuator 26 is a double-acting linear fluid actuator which includes a cylinder 56 having a chamber 57, a rod-end member 58, a cap end member 59, a piston 60, and a piston rod 61. The piston 60 divides the chamber 57 into a rod-end portion 57a and a cap end portion 57b. The cylinder 56, and the rod-end member 58, and the cap end member 59 have a square external configuration and are secured together at their corners by a number of screws of which screws 62 and 63 are illustrated. The piston 60 and the piston rod 61 are provided wtih means that define an axial fluid passage 64 therethrough, the passage 64 terminating in an enlarged recess 65 within the piston 60. The piston rod 61 is slidably and sealably supported and guided by the rod-end member 58, there being a fluid seal 66 at the O-ring type and a wiper 67 operative on the outer surface thereof. This support and sealing function occurs intermediate the ends of the piston rod 61, and the end of the piston rod 61 which is remote from the piston 60 extends to the adjacent actuator 25 for cooperation therewith.

In like manner, the actuator 27 has an identical piston rod 68 which extends through the cap member 59 of the actuator 26, the piston rod 68 being provided with threads 68a which mate wtih threads 59a in the cap end member 59. An O-ring seal 69 precludes any leakage from the chamber portion 57b past the outside of the piston rod 68. To facilitate tightening of the threads 68a the piston rod 68 is provided with a pair of flats 68b which may be gripped by a hand tool.

The distal end 68c of the piston rod 68 extends through the cap end member 59 into the chamber portion 57b and is slidably receptive telescopically by the recess 65 in the piston 60. In like manner, the piston rod 68 has an axial fluid passage 68d extending through the interconnected cap end member 59 and the piston of the actuator 27. It will be noted that the rod end of the actuator 27 is identical to the rod end of the actuator 26. Thus the several piston rods of the various actuators are each rigidly connected to the adjacent cap end of the adjacent actuator are sealably secured thereto intermediate the ends of such piston rod.

The rod end 58 has an abutment surface 70 which is parallel to an abutment surface 71 on the cap end 59. Similarly, the piston 60 has an abutment surface 72 and an oppositely directed abutment surface 73 which are parallel to the abutment surfaces 70 and 71. When pressure is applied to the chamber portion 57b, the abutment surfaces 70 and 72 engage leaving a space between the abutment surfaces 71 and 73 which comprises a precisely determined full travel of the actuator 26.

In the like manner, when the abutment surfaces 71 and 73 are in engagement with each other, an identical space or travel is defined between the abutment surfaces 70 and 72.

The cap end member 59 is provided with a further O-ring 74, and the piston 60 is provided with an O-ring 75 and a pair of spiral Teflon back-up rings 76, 76.

The piston 60 is further provided with cylindrical means 77 on one side thereof which has an outside diameter smaller than the outside diameter of the piston 60, and which cylindrical means 77 is directed toward the adjacent cylinder end, here the rod-end member 58.

The rod-end member 58 is provided with means telescopically receptive of the cylindrical means 77 which means communicates with a fluid port 79 which comprises an individual fluid connection leading to the chamber portion 57a.

When the fluid pressure is applied to the inlet port 79 the piston 60 is moved to the right until the abutment surfaces 71, 73 engage with each other. Fluid in the chamber portion 57b flows through one or both of the passages 64, 68d. By a greater fluid pressure as applied to one of the passages 64, 68d, the piston is urged in the opposite direction until the abutment surfaces 70 and 72 abut each other, fluid being exhausted through the fluid port 79. However, application of such fluid pressure also causes fluid to flow into the other of the axial passages, such as to the actuator 27 to effect extension of its piston. Since all of the actuators in an aligned group have similar piston rod passages, a single fluid connection suffices to pressurize the cap-end chamber portions of two or more actuators.

In a typical installation, a fluid pressure will be continuously applied to the various fluid passages such as 64 and 68d, for example 400 p.s.i. Acting alone, such pressure would cause extension of all of the actuators to their maximum lengths. However, without relieving such pressure, a higher pressure is simultaneously applied to individual fluid ports such as 79 through a separate valve for each such port. Such higher pressure may comprise, for example, 1000 p.s.i., which pressure is sufficient in the chamber portion 57a to overpower the lesser pressure in the chamber portion 57b to retract the piston 60, thereby placing the actuator 26 in its shortest length. Doing so, however, has no effect on any other actuator in the series since each actuator is thus individually selectably operable. It is to be understood that the higher pressure may be employed to overpower the effect of the common pressure at any selected number of actuators from none to all inclusive.

The actuator 26 is illustrated in an intermediate condition which represents a dynamic condition of movement toward one or the other end. As the cap end member 59 is approached, the distal end 68c of the piston rod 68 of the actuator 27 will enter the recess 65, which may be slightly bell-mouthed, to progressively reduce the effective flow area through which the fluid in the chamber portion 57b may be discharged into the fluid passage 64. This fluid restriction eases the surfaces 71 and 73 into positive engagement with each other, it being preferable that they be hardened to withstand prolonged usage of this type. When the piston 60 is fully seated toward the cap end 59, the distal end 68c of the piston rod 68 further coacts with the passage-defining means 65 of the piston 60 to define a smooth continuous passage which thereby enables the passage of fluid with a minimum of turbulence or other frictional losses.

In like manner, the cylindrical portion 77 on being received in the recess 78 restricts fluid flow out of the chamber portion 57a to limit or preclude heavy pounding between the surfaces 72 and 70. During such movement, a higher pressure will be present in the chamber portion 57a than will be present in the outlet 79, thereby holding a check valve 80 which communicates therewith closed. When the higher pressure is applied to the fluid port 79, fluid flows into the end of the recess 78, unseating the check valve 80, thereby readily admitting fluid pressure to the adjacent side of the piston 60.

It is to be understood that the piston buffing or checking structure may be omitted from the actuators having extremely small travels.

The various actuators may be fluidly controlled by conventional components. As shown in FIG. 1, fluid may be supplied at a relatively lower pressure by a pump 82 to a fitting 83 for the actuators 12–15, and to a fitting 84 for the actuators 16–31. The pressure from such pump would tend to cause all such actuators to move to their fully extended positions. However, a further pump 85 delivers a relatively higher pressure to a manifold 86 leading to a separate three-way solenoid actuated valve for each of the actuators. Two such valves 87, 88 are illustrated as delivering such higher pressure fluid to the individual fluid port of the actuators 18 and 19. This fluid pressure overpowers the lower pressure and thus causes all of the actuators to be respectively retracted to the position illustrated in FIG. 1. When one of the valves such as 87 is energized, the fluid port of the actuator 18 is cut off from the manifold 86 and is vented to a return line 89, thereby enabling the lower pressure to expand or extend the associated actuator.

A manual switch 90 is provided for the valve 88 and a manual switch 91 is provided for the valve 87. Similar switches are provided for the numerous other similar valves which have been omitted from the drawing. Actuation of such switch such as 90 or 91 thus effects full travel of the associated actuator. More sophisticated switching structure may be utilized. By way of example, a switch 92 may be employed to simultaneously close the circuits to the valves 87 and 88, thereby effecting a displacement which is equal to the sum of the associated actuators. Appropriate flexible or yieldable fluid lines are provided to each of the movable actuators.

The circuit of FIG. 1 may be modified as shown in FIG. 3. When it is so modified, the various valves normally vent the chamber portions such as 57a so that the actuators normally are in their fully extended position. Energizing of a valve such as 93 would effect retraction or contraction of the associated actuator.

The switching mechanism or mechanisms employed to control the various solenoid valves may be very simple such as the several switches 90, 91, and it may be considerably more sophisticated wherein various combinations of the valves are simultaneously manually or automatically actuated. By a proper use of full travels of actuators as taught in my application for U.S. patent identified above, a system is obtained which is particularly advantageous.

Although the embodiment shown in FIG. 1 is ideally suited for effecting relative displacements dimensioned on Cartesian coordinates, it is to be understood that the instant invention may be practiced also to obtain relative shifts wherein the desired dimensions are given in terms of polar coordinates. FIG. 4 shows a workpiece or element 94 supported on a rotary stage 95 which is rotatably driven by a rack 96 guided between the periphery of the stage 95 and a fixed element 97, it being understood that the rack 96 is driven by a series of actuators of the type described including actuators 98, 99. A further element such as a tool 100 is extended or retracted by a series of actuators including actuators 101, 102 along a radius of the stage 95. The other actuators, including the actuators 98 and 99, collectively are given units of travel and magnitudes of full travel which, acting on the effective diameter of the stage 95, comprise degrees or radians. The series of actuators 98, 99 is thus secured at a fixed end to a support and guide means 103, while the group of fluid actuators 101, 102 are supported and guided by means 104, all as described above for positioning the element 100 along a straight line with respect to the other axis, the position of which is established by the angular position of the stage 95.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A mechanism for moving an element in a straight line, comprising:
    (a) a group of aligned linear double-acting fluid actuators, each actuator having
        (1) a cylinder movable with respect to the other cylinders, and having a rod end and a cap end,
        (2) a piston movably disposed therein,
        (3) a piston rod for each actuator, said rod being of reduced diameter, being secured to said piston, and extending through the rod end of said cylinder, and
        (4) a fluid port leading to one side of said piston by which port the actuator is individually actuatable,
    one end of said group being fixedly supported, and the other end of said group being adapted to be coupled to the element;
    (b) the cap end of each cylinder being rigidly connected to the piston rod of any adjacent one of said actuators; and
    (c) means defining an open fluid passage extending as a single straight line
        (1) completely through one of said pistons,
        (2) completely through the piston rod connected to said one piston, and
        (3) completely through the cap end connected to the said piston rod.

2. A mechanism according to claim 1 wherein the cylinder of the actuator which is fixedly supported is provided with a further fluid port which continually is in fluid communication through said fluid passage means with the cap-end sides of the pistons within the separate cylinders.

3. A mechanism according to claim 1 wherein
    (a) the cylinder of the actuator which is fixedly supported is provided with a further fluid port which is continually pressurized with a first pressure which passes through said fluid passage means to apply a force to the cap-end sides of the pistons within the separate cylinders; and
    (b) said first-named fluid ports leading to the rod-sides of said pistons and hence to the smaller effective sides thereof and which ports are selectively individually pressurized with a second higher pressure of sufficient magnitude to overcome said force.

4. A pair of aligned double-acting fluid actuators, each comprising a separate cylinder, a pair of pistons respectively disposed in said cylinders, a pair of piston rods respectively secured to said pistons and each extending out of the corresponding cylinder, said piston rods and said pistons each having an axial passage therethrough, one of said piston rods extending through the cap end of the cylinder of the other actuator, and being rigidly and sealably secured intermediate its ends thereto, the distal end of said one piston rod being relatively movable into proximity with the piston of said other actuator to coact therewith to define a continuous passage through said other actuator when the piston of said other actuator is near one limit of travel.

References Cited by the Examiner

UNITED STATES PATENTS

| | | | |
|---|---|---|---|
| 691,692 | 1/1902 | Zweigbergk | 91—167 |
| 2,573,333 | 10/1951 | Hillix | 92—61 |
| 2,606,761 | 8/1952 | Group | 92—61 |
| 2,969,042 | 1/1961 | Litz | 91—167 |
| 2,973,744 | 3/1961 | Hennells | 91—26 |
| 2,983,256 | 5/1961 | Seeloff | 92—110 |
| 3,025,836 | 3/1962 | Cook | 91—26 |

FOREIGN PATENTS 542,831   6/1957   Canada.

SAMUEL LEVINE, *Primary Examiner.*

P. T. COBRIN, *Assistant Examiner.*